Figure 1:
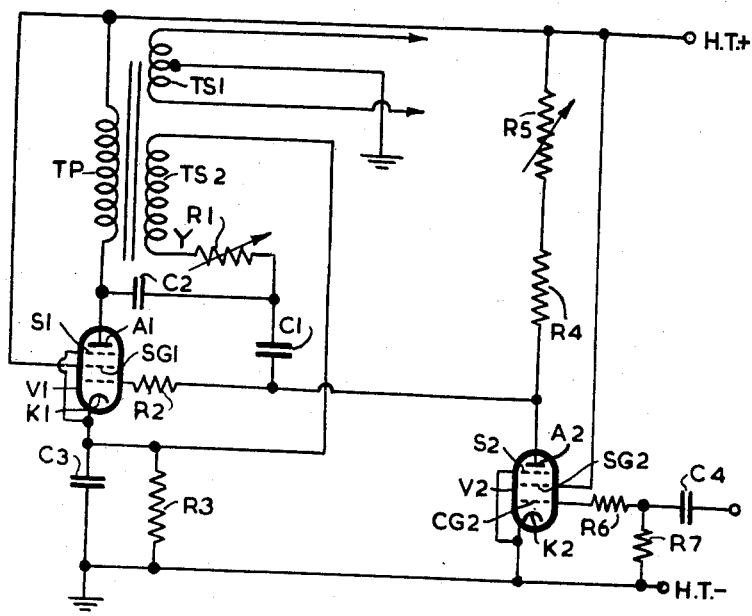

July 19, 1955

L. W. WHITAKER 2,713,638

SAW TOOTH CURRENT WAVE GENERATORS

Filed Oct. 26, 1948

3 Sheets-Sheet 1

Inventor:
Leonard William Whitaker;
By his attorneys,
Baldwin, Wight, & Brevoort July 19, 1955    L. W. WHITAKER    2,713,638
SAW TOOTH CURRENT WAVE GENERATORS
Filed Oct. 26, 1948    3 Sheets-Sheet 3

INVENTOR
LEONARD WILLIAM WHITAKER,
BY Baldwin & Wight
ATTORNEY ent circuit diagram. Where possible like references are used for like parts in the figures.

United States Patent Office 2,713,638
Patented July 19, 1955

2,713,638

SAW TOOTH CURRENT WAVE GENERATORS

Leonard William Whitaker, Enfield, England, assignor to Marconi's Wireless Telegraph Company Limited, London, England, a company of Great Britain Application October 26, 1948, Serial No. 56,608

Claims priority, application Great Britain January 9, 1948

2 Claims. (Cl. 250—36)

This invention relates to saw tooth current wave generators and more specifically to such generators of the kind in which linearizing of the saw tooth wave is effected by means of a linearizing circuit included in a series feed back path between the output and input sides of the output valve of the generator. A well known example of a generator of this kind is the so-called "magnetic Miller" arrangement in which a linearizing circuit consisting of a resistance and a capacity in series is included in a feed back path between the output circuit and a control grid of the output valve of the generator.

The most important object of the invention is to provide an improved saw tooth current wave generator of the kind referred to which may be made to have a higher degree of linearity than known generators of comparable simplicity and otherwise comparable performance.

A further object of the invention is to provide an improved generator of the kind referred to wherein independent control of linearity and of the amplitude of the saw tooth current wave may be readily obtained.

Although the invention is not exclusively limited thereto its primary application is to framing generators for television and like systems for in such generators the obtaining of a high degree of linearity is a foremost requirement and it is also of substantial advantage for the linearity and amplitude controls to be independent.

According to this invention a saw tooth current wave generator of the kind referred to has its linearizing circuit included in series with an additional transformer winding which is coupled to a winding in the anode circuit of the output valve of the generator and is electrically separate from the winding through which the load is fed.

The additional transformer winding may be connected at the end remote from the linearizing circuit to the cathode of the output valve instead of to a point of relatively fixed potential, said cathode being connected to a point of relatively fixed potential through a suitable impedance.

In certain embodiments of the invention the output valve has its anode connected to the primary of a transformer having a secondary winding which feeds the load (normally the frame deflector coils of a television set) and an additional winding which is connected at one end to the cathode of the output valve and at the other end through a linearizing circuit consisting of a resistance and capacity in series to the control grid circuit of said output valve, said other end being that end which varies in potential in phase with the anode of said output valve.

The periodicity of the generator may be controlled by a switching valve having its anode coupled to the control grid of the output valve but in a somewhat simpler arrangement, in which there is no need to specify connection of the feedback or additional winding at one end to the output valve cathode, the said output valve is a pentode or other multi-grid valve and periodicity control is effected by pulses applied to a grid adjacent the anode—in the case of a pentode the suppressor grid.

Figure 2:
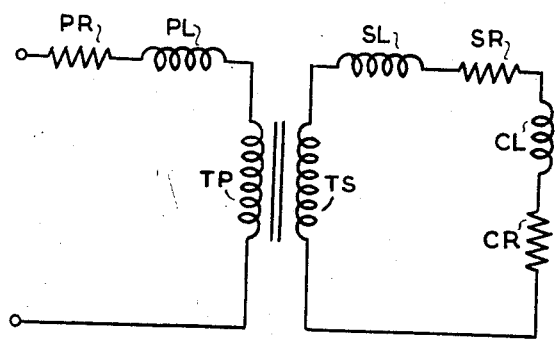

The invention is illustrated in and further explained in connection with the accompanying drawings in which Figs. 1, 3, 4, 5 and 6 illustrate a number of embodiments diagrammatically and Fig. 2 is an explanatory equivalent circuit diagram. Where possible like references are used for like parts in the figures.

Referring to the embodiment shown in Fig. 1 an output valve V1, which may be of any convenient type but for simplicity will be assumed to be a pentode with its suppressor grid S1 connected to the cathode K1, has its anode A1 connected through the primary TP of a transformer to the positive terminal HT+ of a source (not shown) of high tension potential the screen grid SG1 being also connected to this positive terminal. This transformer has a secondary winding TS1 whose ends are connected to the frame deflector coils (not shown) of a television set. If desired this secondary may have an earthed center tapping as shown. An additional winding TS2 of the transformer is connected at that end (Y) which fluctuates in voltage in phase with the anode A1 to one end of a linearizing circuit consisting of an adjustable resistance R1 in series with a condenser C1, the condenser end of said circuit being connected through an anti-parasitic resistor R2 to the control grid CG1 of the output valve V1. A small condenser C2 whose function is to prevent high frequency self-oscillation due to phase shift between the anode and control grid of the output valve, is connected between the anode A1 and the junction point of the elements R1 and C1. The adjustable resistance R1 constitutes the linearizing control. The cathode K1 of the output valve is connected to earth through a capacity shunted resistance combination R3, C3 which provides self-bias.

The periodicity of the saw tooth current wave generator is controlled by means of a switching valve V2 which may also be for example, a pentode with its suppressor grid S2 connected to the cathode K2. This valve has its anode A2 connected to the control grid CG1 of the output valve V1 through the anti-parasitic resistance R2 and also connected to the positive terminal HT+ of the high tension source through a resistance at least part of which is adjustable. As shown this resistance consists of two resistance elements R4, R5 in series the latter, which is adjustable, serving for amplitude control. The screen grid SG2 of the switching valve V2 is connected to the positive terminal HT+ of the high tension source and the cathode K2 is earthed. Positive pulses of predetermined width and at the frame repetition frequency are applied to the control grid CG2 of the switching valve V2 through a condenser C4 in series with an anti-parasitic resistor R6 the junction point of the two elements C4, R6 being connected to earth through a further resistance R7 which, in conjunction with the said condenser C4, provides grid current bias and presents a time constant which is long enough to keep the switching valve V2 completely cut off during intervals between pulses. Owing to the necessity for keeping the switching valve cut off during the intervals between positive pulses, the said pulses must be of adequate amplitude. The leading edges of the pulse which render the switching valve conductive and cut off the output valve, determine the times of commencement of the "fly-back" periods. The pulse width, while not determining the "fly-back" duration has an optimum value which gives the best output current wave shape, but, once set, it does not affect the ability of the linearity control to exercise its proper function.

The theoretical and practical advantages of the invention may best be understood by considering the requirements for a linearly rising output current wave. The equivalent circuit for a set of deflector coils fed through a transformer is shown in Fig. 2 and comprises a primary circuit in which the transformer primary resistance PR and leakage inductance PL are represented by resistance and inductance in series with the primary TP and a secondary circuit in which the transformer secondary resistance SR and leakage inductance SL and the coil resistance CR and coil inductance CL are all in series with the secondary TS. From a consideration of this equivalent circuit it will be at once apparent that to obtain a linear rise of current in the coils requires across the secondary a voltage which is the combined resultant of a constant voltage and a linearly rising voltage, the former component being that necessary to overcome the inductive impedance and the latter component being that necessary to overcome the resistive impedance. In practice, the linearly changing component usually predominates because the inductive effect is relatively small at the comparatively low frequencies normally required for television framing. The required secondary voltage in turn requires that the magnetizing current through the transformer primary shall have a wave shape which approximates to a parabola. The total primary current is, of course, the sum of the load component of current (referred to the primary) and the magnetizing current and the required total current does not, therefore, change linearly with time.

It is not practicable to make the primary resistance and leakage inductance (especially the former) of the transformer negligibly small and, since the voltage drop across these two parts of the equivalent primary circuit is not the combined resultant of a constant component and a linearly rising component the required applied voltage across the whole transformer primary is also not of this form. If, therefore, the series resistance-capacity linearizing circuit were connected between the anode of the output valve and the control grid thereof, it could not do more than ensure that the anode voltage was the combined resultant of a constant component and a linearly rising component and, as has been shown, this is not what is required. With the arrangement of the present invention, however, in which a separate additional winding (TS2 of Fig. 1) is employed for the linearizing circuit, the said separate winding may if desired be made similar to the primary as regards number of turns, leakage inductance and resistance, because the current through the said separate winding will change only very slightly due to the high A. C. resistance of the feed back circuit of which it forms part. There is thus no appreciable voltage drop due to leakage inductance while the winding resistance of said additional winding may be regarded as part of the resistance in the linearizing feed back circuit. Hence the voltage across the external terminals less the D. C. voltage drop internally is substantially the same as that across the primary winding in the equivalent circuit (not the actual primary winding, be it noted).

The required voltage wave shape across the primary winding in the equivalent circuit and hence, therefore, across the said additional winding is a combination of a constant component and a linearly rising component so that a suitable arrangement of series resistance and condenser between the control grid of the output valve and the additional winding can be made to give a linearly rising current in the load.

The connection of one end of the additional winding to the cathode of the output valve instead of to a point of fixed potential contributes largely to the obtaining of a high degree of linearity. For this it is required that the voltage variations across the additional winding be of exactly the same wave shape as those across the series resistance-capacity feed back circuit. Owing to the difficulty of obtaining de-coupling condensers of sufficient size there will generally be some appreciable variation of voltage across the condenser between the cathode of the output valve and earth and by connecting the end of the said additional winding to the cathode the voltage variations across this condenser are prevented from contributing to the voltage variations across the said additional winding. Accordingly a high degree of linearity is retained without any necessity of making the last mentioned condenser of inconveniently large size.

Figure 3:
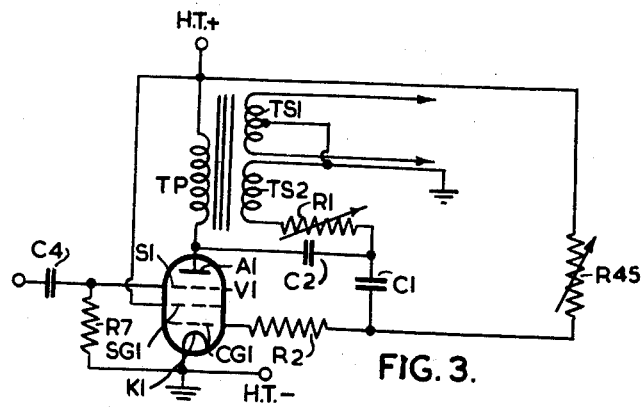

Fig. 3 shows another embodiment the principal advantage of which is improved circuit simplicity the switching valve V2 of Fig. 1 being eliminated. In Fig. 3 the frame repetition pulses, which are now negative-going pulses are applied to the suppressor grid S1 of the pentode V1 which serves as the output valve. This pentode valve which has a suppressor grid characteristic such that the anode current may be completely cut off by a practically realizable negative suppressor grid pulse, has its anode A1 connected to HT+ through the transformer primary TP. The screen grid SG1 is also connected to HT+ and the cathode K1 is connected to HT— and to earth. Negative going frame frequency pulses are applied through a condenser C4 to the suppressor grid which is connected to cathode through a resistance R7. The transformer has a center tapped secondary TS1 the ends of which are connected to the frame deflector coils (not shown) and the center-tap of which is earthed as in Fig. 1. The additional winding TS2 of the transformer is again connected in series with the linearizing circuit, said winding being earthed at one end and connected at the other through a resistance R1, a condenser C1 and a further resistance R2 to the control CG1. At least a part of the resistance R1 is made adjustable for linearity control and a condenser C2 is connected between the anode A1 and the end of resistance R1 remote from the winding TS2. Amplitude control is obtained by an adjustable resistance R45 included in a resistive circuit connected between HT and the control grid CG1 and which also includes the already mentioned resistance R2.

Figure 4:
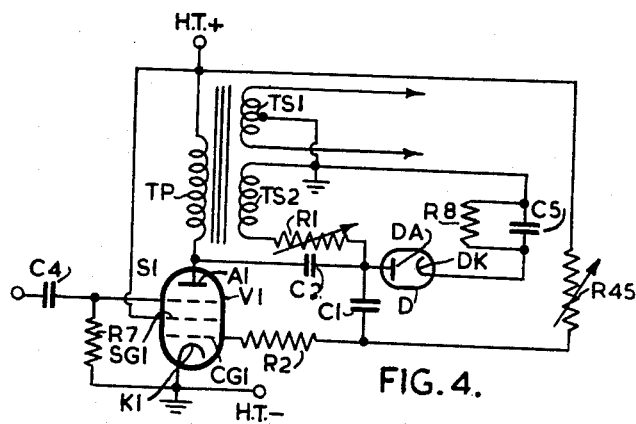

With this embodiment, as with the embodiment described of Fig. 1 it may be found that, when the output sawtooth amplitude exceeds a certain limit, instability may occur although the output valve is far from overloaded. If this occurs the wave form produced ceases to be a correct sawtooth and exhibits a fundamental frequency one half of the input framing pulse frequency. Careful design of the transformer may lift the output amplitude limit at which such instability occurs but, with the embodiment of Fig. 3, such instability may be avoided without troubling unduly in the matter of transformer design by connecting a diode or rectifier circuit between the condenser side of the linearity controlling adjustable resistance and earth as shown in Fig. 4. Referring to Fig. 4 it will be seen that this circuit comprises a diode D (or other rectifier), having its anode DA (or equivalent terminal) connected to the junction point of R1 and C1 and its cathode DK (or equivalent terminal) connected to earth through a large capacity C5 shunted by a resistance R8 of such value that the time constant of the combination is long in relation to the desired sawtooth repetition time.

With the rectifier circuit provided as in Fig. 4 a definite limit is set to the voltage rise possible at the condenser end of the linearity controlling resistance R1 during the re-charge period immediately following the initiation of the "flyback." Once the potential at this point tries to rise above that of the large condenser C5 in the rectifier circuit, the rectifier in effect short circuits the re-charge path. Since the time constant of the resistance-capacity combination C5–R8 is long relative to the framing time period, very little change occurs in the potential across the said large condenser between two successive framing frequency pulses and accordingly the same limit is set on successive voltage peaks at the point in question and instability is avoided. Theoretically, for a given specific amplitude, the time constant resistance-capacity combination could (in this particular circuit) be omitted and the diode cathode connected instead to a point of suitably chosen potential which would, of course, have to be altered if the amplitude was desired to be changed. This however is inconvenient and the arrangement of Fig. 4 is, therefore, much preferred.

Figure 5:
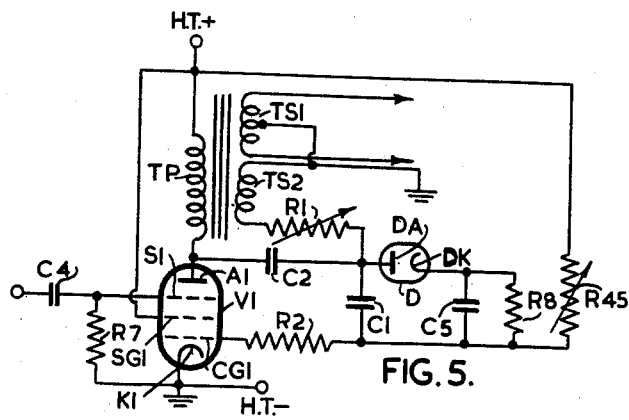

Fig. 5 shows a modification of Fig. 4 differing therefrom only in that, instead of earthing one end of the rectifier circuit the said end is connected to the grid side of condenser C1.

Figure 6:
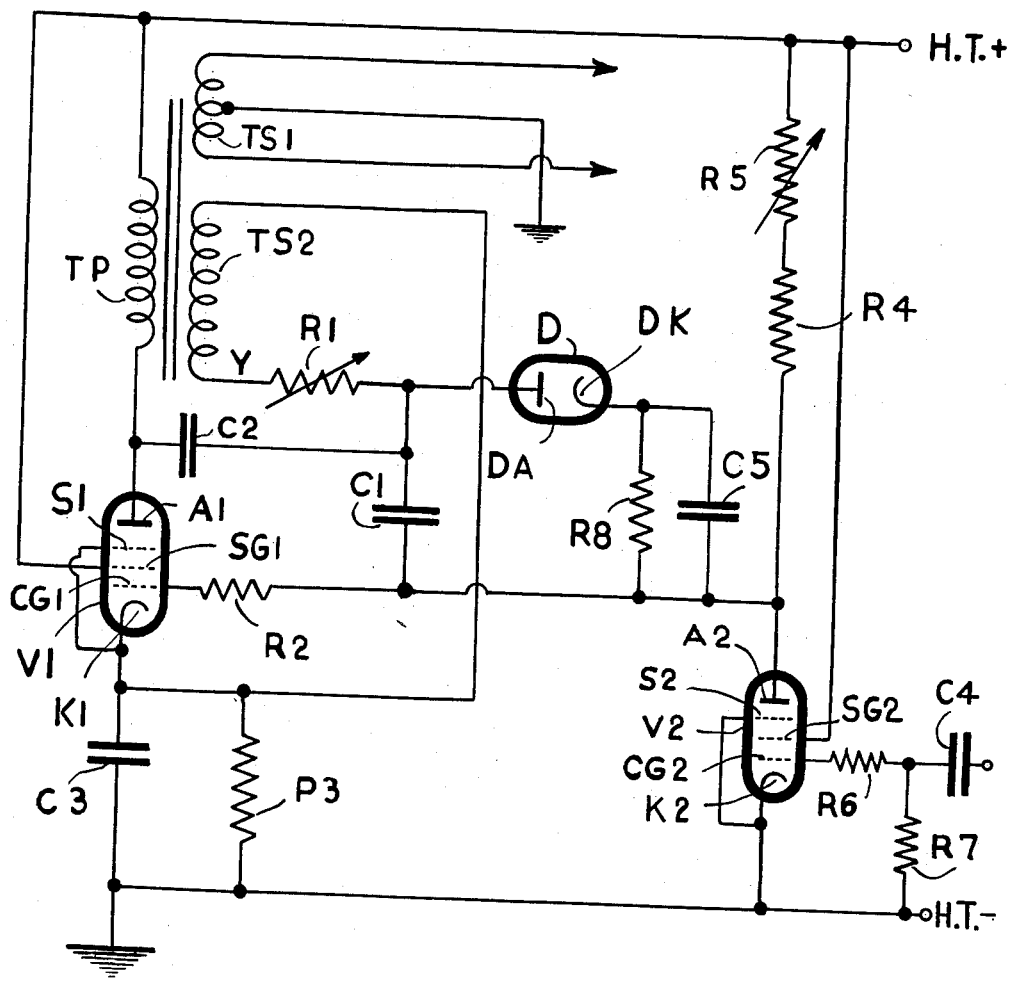

Fig. 6 shows a modified form of the circuit of my invention in which I arrange an additional circuit across the condenser C1 of Fig. 1 for stabilizing the operation of the circuit of Fig. 1. This additional circuit includes a rectifier D, such as a diode having an anode DA and a cathode DK. The anode DA is connected with one side of condenser C1, while cathode DK connects to the other side of condenser C1 through a circuit which contains resistor R8 across which condenser C5 is connected. This additional circuit operates to stabilize the operation of the saw tooth wave current generator by establishing a selected DC bias potential on control grid CG1 through resistor R2.

While I have described the invention in certain preferred embodiments, I realize that modifications may be made and I desire that it be understood that no limitations upon my invention are intended other than may be imposed by the scope of the appended claims.

What I claim is:

1. A saw tooth current wave generator including an output valve having a cathode, an anode and at least a control grid therebetween, a source of anode potential, a transformer having a single primary winding connected between said anode and said source and two electrically separate secondary windings coupled to said primary winding, an output circuit connected to one only of said secondary windings fed with energy only thereby and a linearizing circuit comprising resistance and capacitance included in series with one another and with the other of said secondary windings in a series circuit extending between said control grid and said cathode, and a path including a rectifier in shunt across said capacitance, said rectifier being connected in said path with its unilaterally current conductive direction toward said cathode.

2. A generator as set forth in claim 1 wherein said cathode is connected to a point of fixed potential through an impedance.

References Cited in the file of this patent

UNITED STATES PATENTS

| Number | Name | Date |
|---|---|---|
| 2,110,245 | Stocker | Mar. 8, 1938 |
| 2,165,815 | Rhes | July 11, 1939 |
| 2,250,706 | Geiger | July 29, 1941 |
| 2,265,620 | Bahring | Dec. 9, 1941 |
| 2,360,697 | Lyman | Oct. 17, 1944 |
| 2,482,150 | Bocciarelli | Sept. 20, 1949 |
| 2,540,692 | Schade | Feb. 6, 1951 |
| 2,554,924 | Schlesinger | May 29, 1951 |